United States Patent
Ries et al.

(10) Patent No.: US 6,817,313 B1
(45) Date of Patent: Nov. 16, 2004

(54) SUET BIRD FEEDER SYSTEM

(76) Inventors: Gregory D. Ries, 17680 Marystown Rd., Shakopee, MN (US) 55379; Sara Ries, 17680 Marystown Rd., Shakopee, MN (US) 55379

( * ) Notice: Subject to any disclaimer, the term of this patent is extended or adjusted under 35 U.S.C. 154(b) by 0 days.

(21) Appl. No.: 10/615,890

(22) Filed: Jul. 8, 2003

(51) Int. Cl.[7] .......................... A01K 39/00; A01K 5/00; A01M 25/00

(52) U.S. Cl. ................................ 119/51.03; 119/51.01; 43/131

(58) Field of Search .......................... 119/51.01, 51.03, 119/57.8; 43/131; D30/124, 127

(56) References Cited

U.S. PATENT DOCUMENTS

| | | | |
|---|---|---|---|
| 137,259 A | 3/1873 | Tasker et al. | |
| 711,170 A | 10/1902 | Michelson | |
| 2,235,959 A | 3/1941 | Copeman | 119/51 |
| 2,306,312 A | 12/1942 | Hyde | 119/51 |
| 2,801,609 A | * 8/1957 | Webster | 119/51.03 |
| 2,833,247 A | * 5/1958 | Beyea | 119/51.03 |
| 2,908,250 A | 10/1959 | Aniser | 119/51 |
| D194,610 S | * 2/1963 | Hume | D30/128 |
| 3,175,536 A | * 3/1965 | Hilaire | 119/51.03 |
| 3,200,790 A | 8/1965 | Anderson | 119/51 |
| 3,399,650 A | 9/1968 | Goodman | 119/51 |
| 3,664,303 A | * 5/1972 | Baensch | 119/51.03 |
| 4,437,432 A | 3/1984 | Immeyer et al. | 119/18 |
| D277,514 S | 2/1985 | Bescherer | D30/14 |
| 5,052,342 A | 10/1991 | Schneider | 119/51.03 |
| 5,636,591 A | 6/1997 | Loiselle | 119/51.03 |

* cited by examiner

Primary Examiner—Michael J. Carone
Assistant Examiner—Elizabeth Shaw

(57) ABSTRACT

A suet bird feeder system for efficiently providing suet plugs for birds to consume. The suet bird feeder system includes a housing unit having at least one opening with a rear wall and a straight or tapered inner wall, a support member extending from the rear wall, and a suet plug having a tapered sidewall formed to fit within the opening. A storage tray preferably has a plurality of storage cavities having a tapered structure for receiving and storing the suet plugs prior to insertion within the opening.

20 Claims, 6 Drawing Sheets

SUET BIRD FEEDER SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to suet bird feeders and more specifically it relates to a suet bird feeder system for efficiently providing suet plugs for birds to consume.

2. Description of the Related Art

Suet bird feeders have been in use for years. A conventional suet bird feeder is comprised of a housing, a hole that extends completely through the housing, and an elongate suet log that is positioned completely within the hole. The suet log is comprised of a consistent elongate cylindrical shape. Conventional suet logs are typically comprised of animal combined with flavorings such as peanut butter, nuts and seeds. Recent improvements in suet bird feeders are comprised of replaceable rigid plug members that contain the suet that are removably inserted into a hole within a housing structure.

The main problem with conventional suet bird feeders is that they are messy to utilize. A further problem with conventional suet bird feeders is that the suet logs are difficult to extend fully into the hole as required.

Examples of patented devices which may be related to the present invention include U.S. Pat. No. 2,235,959 to Copeman; U.S. Pat. No. 2,306,312 to Hyde; U.S. Pat. No. D277,514 to Bescherer; U.S. Pat. No. 3,200,790 to Anderson; U.S. Pat. No. 2,908,250 to Aniser; U.S. Pat. No. 3,399,650 to Goodman; U.S. Pat. No. 4,437,432 to Immeyer et al.; U.S. Pat. No. 5,052,342 to Schneider; U.S. Pat. No. 5,636,591 to Loiselle; U.S. Pat. No. 711,170 to Michelson; and U.S. Pat. No. 137,259 to Tasker & McMillan.

While these devices may be suitable for the particular purpose to which they address, they are not as suitable for efficiently providing suet plugs for birds to consume. Conventional suet bird feeders are difficult and messy to utilize.

In these respects, the suet bird feeder system according to the present invention substantially departs from the conventional concepts and designs of the prior art, and in so doing provides an apparatus primarily developed for the purpose of efficiently providing suet plugs for birds to consume.

BRIEF SUMMARY OF THE INVENTION

In view of the foregoing disadvantages inherent in the known types of suet bird feeders now present in the prior art, the present invention provides a new suet bird feeder system construction wherein the same can be utilized for efficiently providing suet plugs for birds to consume.

The general purpose of the present invention, which will be described subsequently in greater detail, is to provide a new suet bird feeder system that has many of the advantages of the suet bird feeders mentioned heretofore and many novel features that result in a new suet bird feeder system which is not anticipated, rendered obvious, suggested, or even implied by any of the prior art suet bird feeders, either alone or in any combination thereof.

To attain this, the present invention generally comprises a housing unit having at least one opening with a rear wall and a straight or tapered inner wall, a support member extending from the rear wall, and a suet plug having a tapered sidewall formed to fit within the opening. A storage tray preferably has a plurality of storage cavities having a tapered structure for receiving and storing the suet plugs prior to insertion within the opening.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a suet bird feeder system that will overcome the shortcomings of the prior art devices.

A second object is to provide a suet bird feeder system for efficiently providing suet plugs for birds to consume.

Another object is to provide a suet bird feeder system that is easy and efficient to utilize.

An additional object is to provide a suet bird feeder system that is cleaner than conventional suet bird feeders.

A further object is to provide a suet bird feeder system that ensures that the suet does not collapse within the hole.

Another object is to provide a suet bird feeder system that allows for the easy insertion of a suet plug into a hole within a housing.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
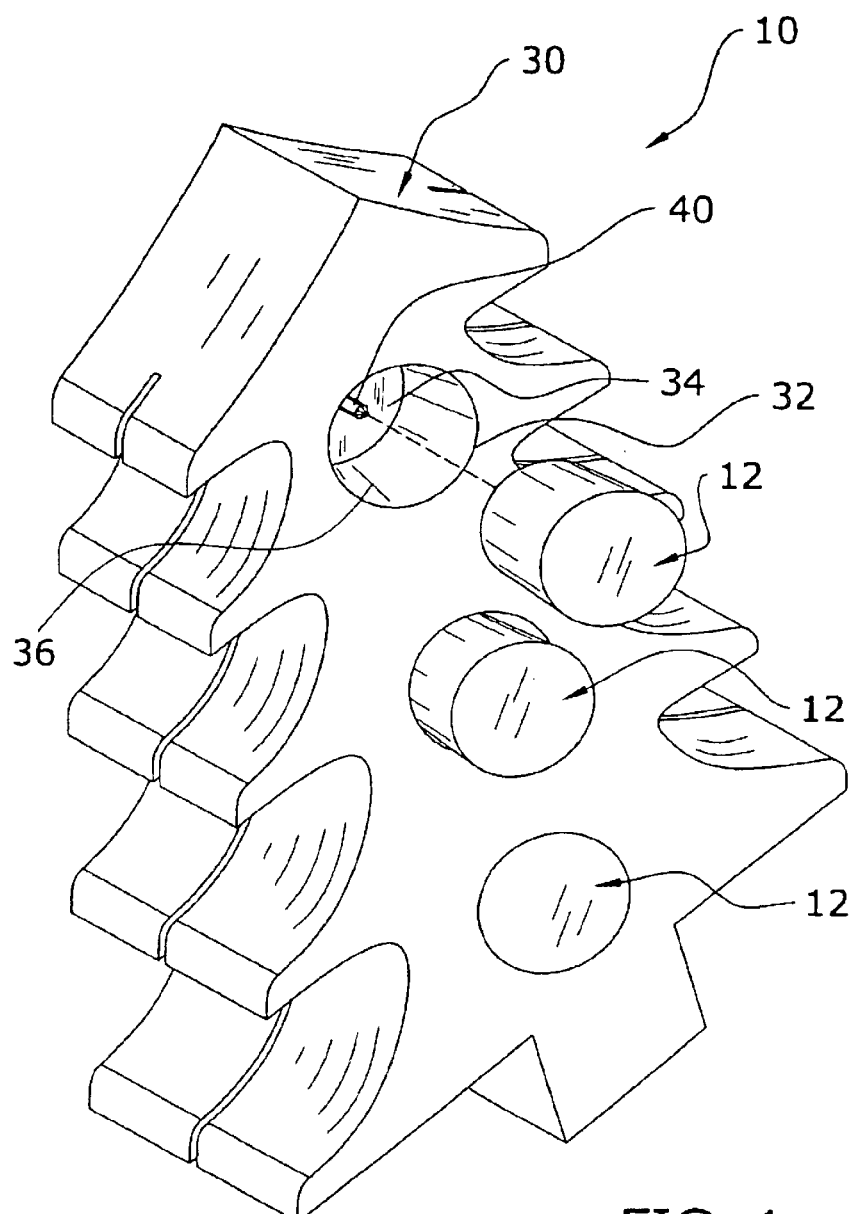
FIG. 1 is an exploded upper perspective view of the present invention.

Turning now descriptively to the drawings, in which similar reference characters denote similar elements throughout the several views, FIGS. 1 through 6 illustrate a suet bird feeder system 10, which comprises a housing unit 30 having at least one opening 32 with a rear wall 34 and a straight or tapered inner wall 36, a support member 40 extending from the rear wall 34, and a suet plug having a tapered sidewall 14 formed to fit within the opening 32. A storage tray 20 preferably has a plurality of storage cavities 22 having a tapered structure for receiving and storing the suet plugs 12 prior to insertion within the opening 32.

B. Housing Unit

Figure 2:
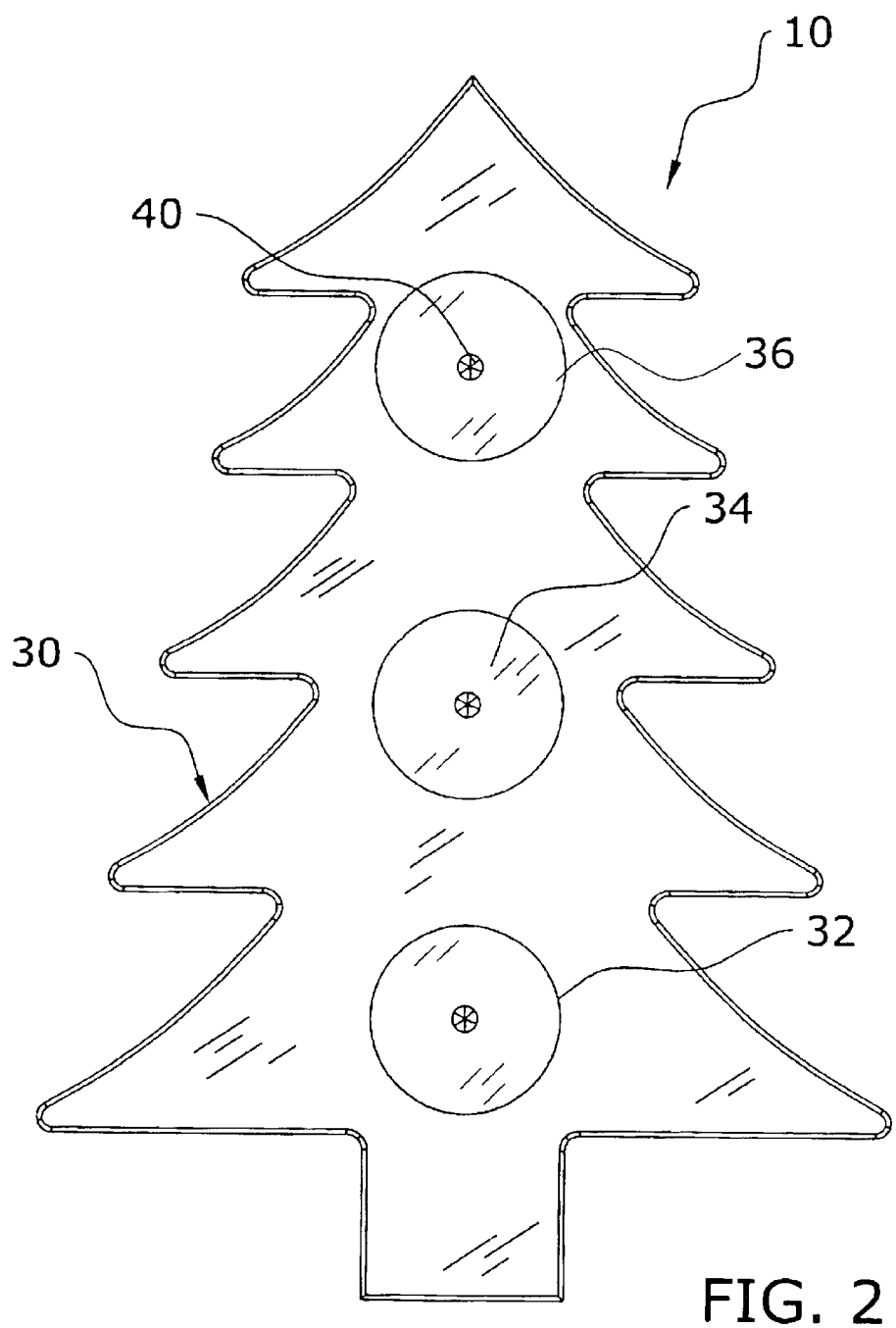
FIG. 2 is a front view of the housing.

The housing unit 30 may be comprised of various shapes, structures and materials. FIGS. 1 and 2 of the drawings illustrate a tree shaped structure for illustration purposes only and should not limit the various structures capable of being utilized to construct the housing unit 30.

The housing unit 30 may be comprised of a solid or non-solid structure. Various materials such as but not limited to wood, plastic, composite and the like may be utilized to construct the housing unit 30. An attachment structure may be attached to the housing unit 30 for attaching and supporting the housing unit 30 to a tree or other physical structure.

Figure 3:
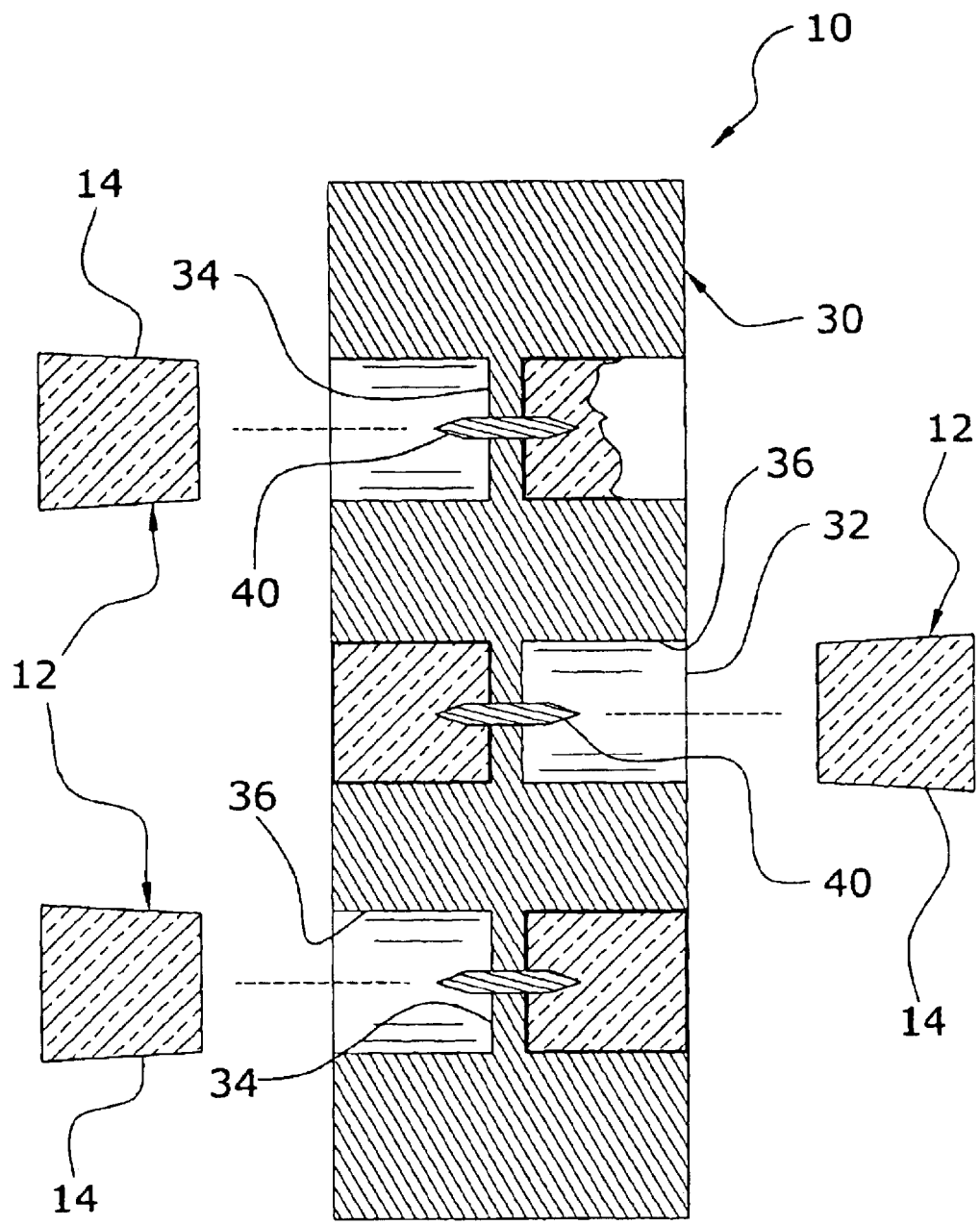
FIG. 3 is a side cutaway view of the housing with suet plugs within and removed from the housing.

As shown in FIGS. 1, 2 and 3 of the drawings, the housing unit 30 has at least one opening 32 for receiving a suet plug. The opening 32 has a rear wall 34 and an inner wall 36 as illustrated in FIGS. 1 through 3 of the drawings. The opening 32 may have a straight structure or a tapered structure from the open end to the rear wall 34 as best illustrated in FIG. 3 of the drawings.

FIG. 3 best illustrates that at least one pair of openings 32 within the housing preferably have a common rear wall 34. The support member 40 preferably extends through the common rear wall 34 into each of the pair of openings 32 as best illustrated in FIG. 3 of the drawings. The distal portions of the support member 40 are spiked structures as further shown in FIG. 3 of the drawings. It can be appreciated that individual support members 40 may extend from individual rear walls 34 instead of sharing a common wall.

The support member 40 preferably extends concentrically from the rear wall 34 as best shown in FIG. 2 of the drawings. The support member 40 is designed to support the suet plug as the birds eat a portion of the suet plug. As the front portion of the suet plug is eaten/removed, the support member 40 provides additional support to the upper rear portion of the suet plug as shown in the upper right opening 32 illustrated in FIG. 3 of the drawings.

The distal portion of the support member 40 preferably has a spiked end for receiving the suet plug, however the distal portion of the support member 40 may have various other structures. The support member 40 extends at least 25% of the length of the opening 32 as illustrated in FIG. 3 of the drawings.

C. Suet Plug

The suet plug is similar in size and shape to the opening 32 of the housing unit 30. The suet plug formed to snugly fit within the opening 32 as best illustrated in FIG. 3 of the drawings. FIG. 3 further illustrates that the opening 32 within the housing unit 30 preferably has a straight or tapered inner wall 36 that corresponds to the tapered sidewall 14 of the suet plug.

D. Storage Tray

Figure 4:
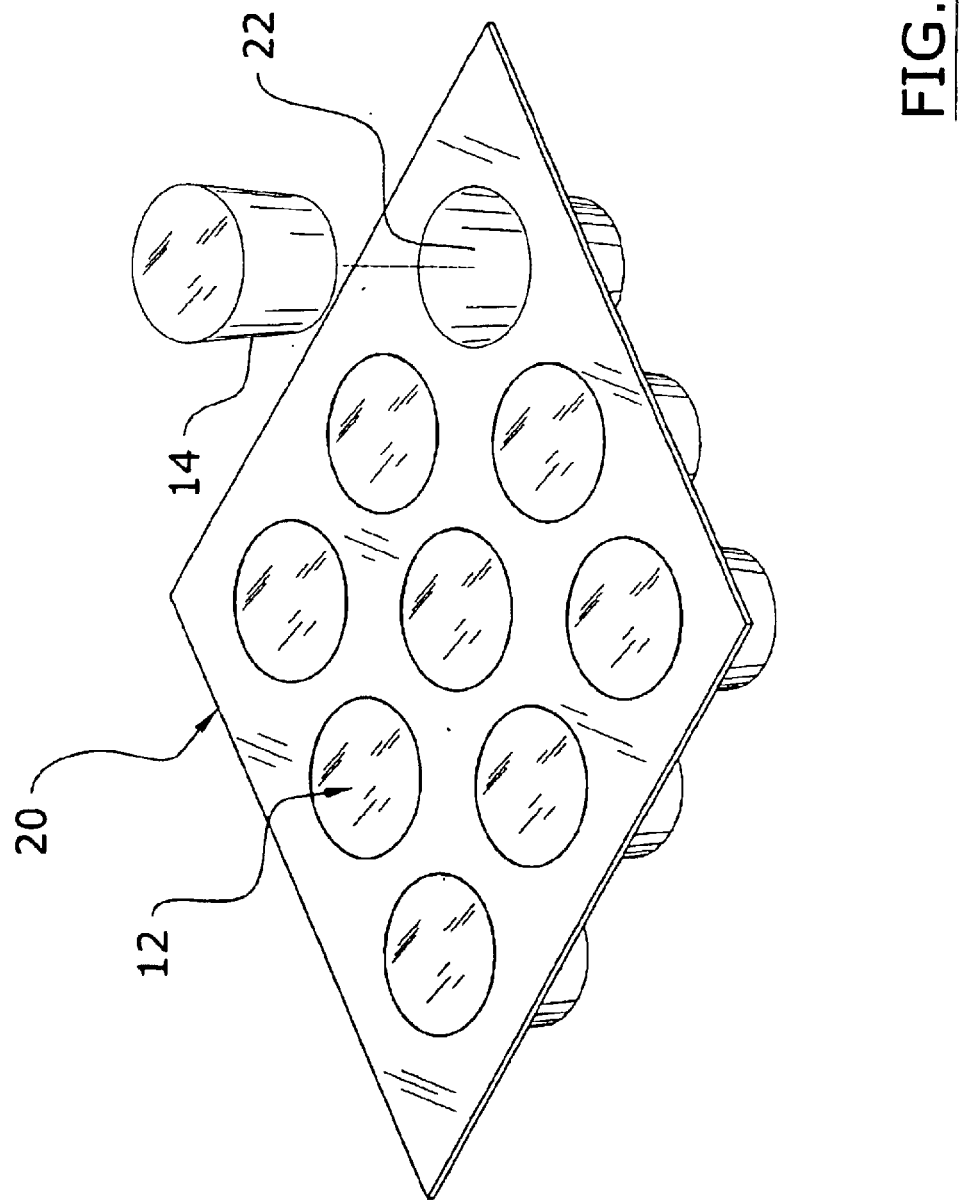
FIG. 4 is an upper perspective view of forming tray with suet plugs within.
Figure 5:
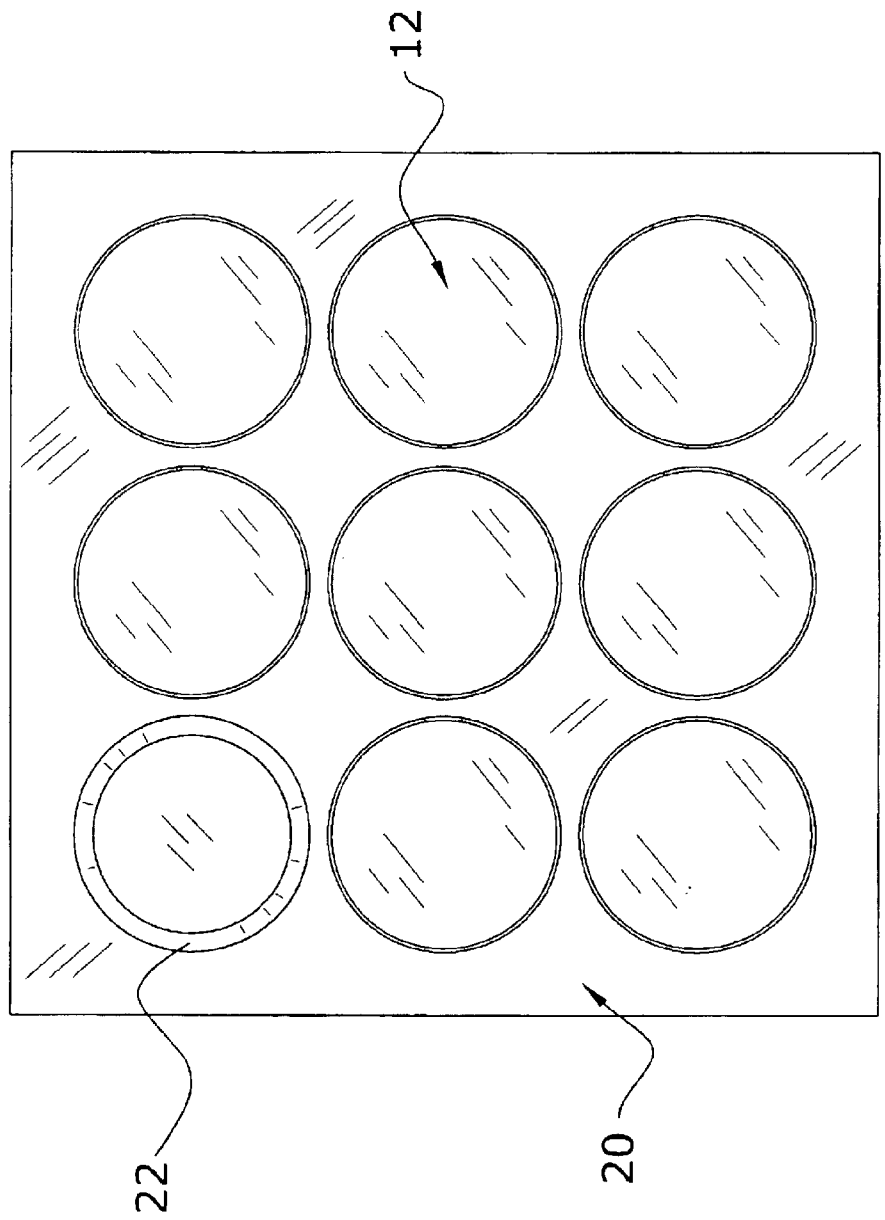
FIG. 5 is a top view of the forming tray with suet plugs within.
Figure 6:
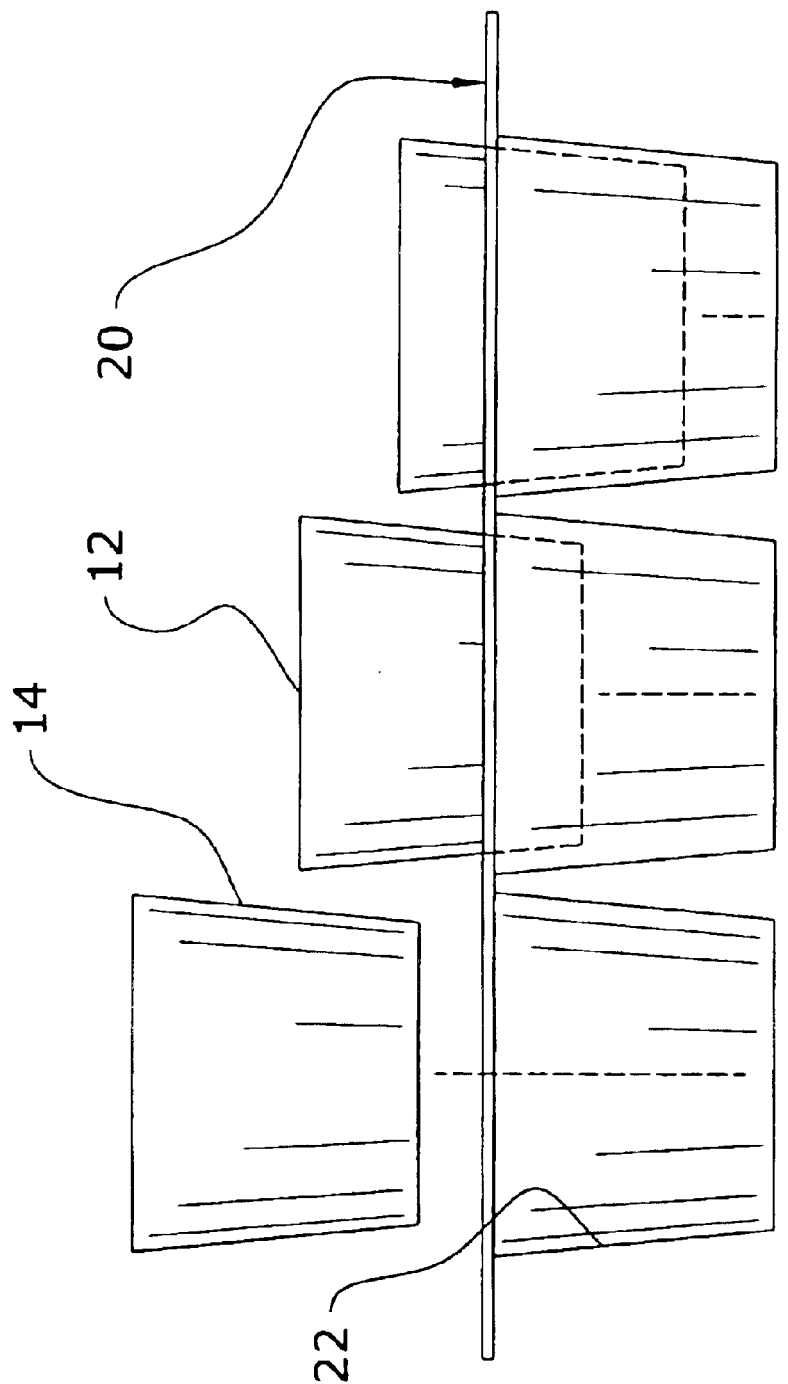
FIG. 6 is a side view of the tray.

A storage tray 20 preferably has a plurality of storage cavities 22 each having a tapered structure for receiving and storing the suet plugs 12 prior to insertion within the openings 32 of the housing unit 30 as shown in FIGS. 4 through 6 of the drawings. The storage tray 20 is preferably comprised of a resilient or flexible material to allow for the easy removal of the suet plugs 12 from the storage cavities 22.

The storage cavities 22 each have a tapered structure thereby allowing for the forming of the suet plugs 12 to a similar shape within as shown in FIGS. 4 and 6 of the drawings. The suet plugs 12 may be formed within the storage cavities 22 of the storage tray 20 from an initial liquid form, or the suet plugs 12 may be formed separate of the storage cavities 22 and inserted when in a solid form.

A removable covering may be attached to the upper portion of the storage tray 20 after the suet plugs 12 are positioned within the storage cavities 22. The storage tray 20 may be stored in a refrigerated area to maintain the suet plugs 12 in a solid form.

E. Operation of Invention

In use, the user removes a suet plug 12 from the storage tray 20 as shown in FIG. 4 of the drawings. The user then inserts the suet plug 12 into an opening 32 within the housing unit 30 as shown in FIGS. 1 and 3 of the drawings. The suet plug 12 is inserted into the opening 32 and is penetrated by the extended support member 40 as shown in FIG. 3 of the drawings. The user continues to insert the suet plug 12 until the front portion of the suet plug is substantially flush to the outer surface of the housing unit 30 as illustrated in FIGS. 1 and 3 of the drawings. This process continues until all of the openings 32 are filled with suet plugs 12. The birds thereafter feed upon the suet plugs 12 within the housing unit 30. As the front exposed portion of the suet plugs 12 are eaten and removed, the support member 40 provides additional support to the upper portion of the suet plugs 12 to ensure that the upper portion thereof does not fall from the opening 32. The above process is simply repeated after the suet plugs 12 are removed from the openings 32 within the housing unit 30.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A suet bird feeder system, comprising:
   a housing unit, wherein said housing includes a plurality of openings, wherein at least one pair of openings within said housing have a common rear wall;
   a support member extending through said common rear wall into each of said pair of openings; and
   a suet plug formed to fit within said plurality of openings.

2. The suet bird feeder system of claim 1, wherein said plurality of openings each have a straight or tapered inner wall and wherein said suet plug has a tapered sidewall formed to fit within said plurality of openings.

3. The suet bird feeder system of claim 1, wherein said support member extends concentrically from said common rear wall.

4. The suet bird feeder system of claim 1, wherein said support member has a spiked end.

5. The suet bird feeder system of claim 1, wherein said support member extends at least 25% of the length of said plurality of openings.

6. The suet bird feeder system of claim 1, wherein distal portions of said support member are spiked structures.

7. The suet bird feeder system of claim 1, wherein said suet plug is similar in size and shape to said plurality of openings.

8. The suet bird feeder system of claim 1, including a storage tray having a plurality of storage cavities having a tapered structure for receiving and storing said suet plugs prior to insertion within said plurality of openings.

9. The suet bird feeder system of claim 8, wherein said plurality of openings have a straight or tapered inner wall and wherein said suet plug has a tapered sidewall formed to fit within said opening.

10. The suet bird feeder system of claim 8, wherein said support member extends concentrically from said common rear wall.

11. The suet bird feeder system of claim 8, wherein said support member has a spiked end.

12. The suet bird feeder system of claim 8, wherein said support member extends at least 25% of the length of said plurality of openings.

13. The suet bird feeder system of claim 8, wherein distal portions of said support member are spiked structures.

14. The suet bird feeder system of claim 8, wherein said suet plug is similar in size and shape to said plurality of openings.

15. A suet bird feeder system, comprising:
   a housing unit having at least one opening with a rear wall;
   a support member extending from said rear wall;
   a suet plug formed to fit within said opening; and
   a storage tray having a plurality of storage cavities having a tapered structure for receiving and storing said suet plugs prior to insertion within said opening.

16. The suet bird feeder system of claim 15, wherein said opening has a straight or tapered inner wall and wherein said suet plug has a tapered sidewall formed to fit within said opening.

17. The suet bird feeder system of claim 15, wherein said support member extends concentrically from said rear wall.

18. The suet bird feeder system of claim 15, wherein said support member has a spiked end.

19. The suet bird feeder system of claim 15, wherein said support member extends at least 25% of the length of said opening.

20. The suet bird feeder system of claim 15, wherein said suet plug is similar in size and shape to said opening.

* * * * *